W. N. SMITH.
PHOTOGRAPHIC DEVICE.
APPLICATION FILED NOV. 10, 1910.
1,011,870.
Patented Dec. 12, 1911.
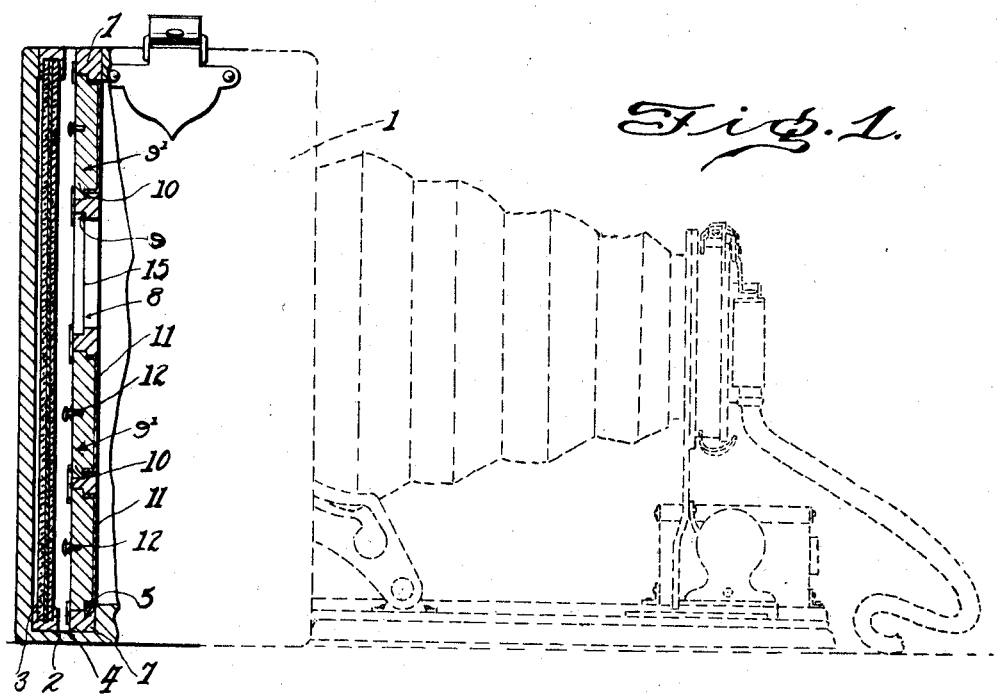
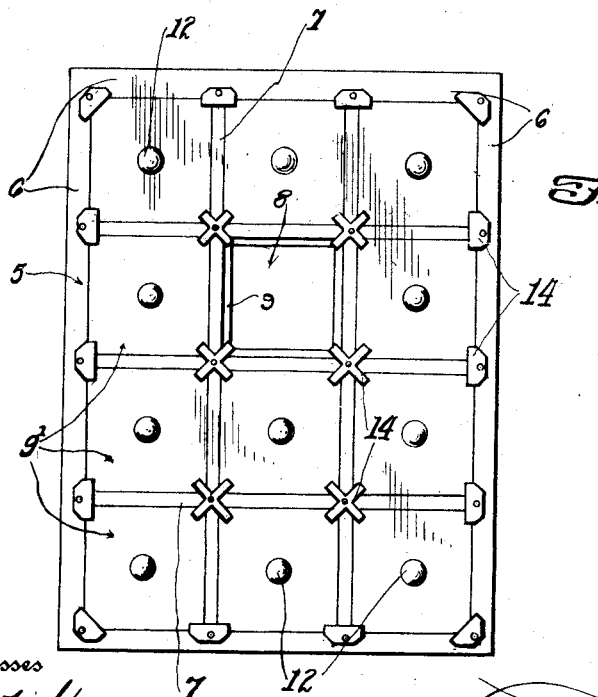
Witnesses
W. C. Fielding
F. C. Howard.
Inventor
W. N. Smith.

UNITED STATES PATENT OFFICE.

WILLIAM N. SMITH, OF BURKEVILLE, TEXAS.

PHOTOGRAPHIC DEVICE.

1,011,870.  Specification of Letters Patent.  Patented Dec. 12, 1911.

Application filed November 10, 1910. Serial No. 591,673.

*To all whom it may concern:*

Be it known that I, WILLIAM N. SMITH, a citizen of the United States, residing at Burkeville, in the county of Newton, State of Texas, have invented certain new and useful Improvements in Photographic Devices; and I do hereby declare the following to be a full, clear, and exact description of the invention, such as will enable others skilled in the art to which it appertains to make and use the same.

My invention relates to improvements in photographic apparatus and more particularly to a device by means of which a number of exposures may be made consecutively on different portions of a sensitized surface.

With this in view, the invention consists primarily in a frame which is adapted to be fitted into the body of a camera parallel to and in front of the ground glass, said frame being provided with intersecting members which define apertures; and in a plurality of shutters adapted to close said apertures.

The invention further consists in a certain construction and arrangement of parts as is hereinafter more fully described, particularly pointed out in the appended claims, and illustrated in the accompanying drawings which show a preferred embodiment of the invention.

In these drawings, Figure 1 is a side elevation of a conventional camera with my device in place the rear portion of the camera being broken away and shown as a sectional elevation, and, Fig. 2 is a front elevation of the frame detached.

Referring more particularly to these views, in which similar reference numerals designate corresponding parts throughout, 1 indicates in general a conventional camera having a grooved base member 2 in which slides the plate holder 3. Referring to Fig. 1 of the drawings it will be seen that the holder groove, here designated as 4 is widened to provide a channel in which slides the rectangular frame 5. This frame comprises side members 6 in which are secured the intersecting transverse members 7 which as shown are disposed at right angles to define a plurality of square apertures here designated as 8. The transverse members and the inside faces of the frame members are rabbeted as at 9 to form a peripheral shoulder on the inside of each square, the whole construction resembling that of a standard sash-frame.

Into the squares above described are fitted a plurality of shutters designated generally by the numeral 9. Each shutter comprises a rabbeted-edge body portion 10 over which is laid a surfacing material 11 which is preferably formed of black fabric, and a thumb button 12. As shown in Fig. 1 these shutters form tight joints with the inside faces of the squares and are flush with the frame members on both surfaces. In order to secure the shutters in the frame apertures, latches 14 are pivoted on pins secured in and extending from the frame members.

In order to make use of the device, it is positioned in the back of a camera as shown in Fig. 1 and one of the shutters is removed to leave an aperture, this aperture being designated in Fig. 1 by the numeral 15. The ground glass is then placed in the position shown in the drawings as being occupied by the plate holder 3 and the camera is focused to give a clear image on the square of ground glass exposed through the aperture 15. Substituting the plate holder for the ground glass or, as is the common practice, inserting the former in front of the latter, an exposure may be made which will be the size of the shutter. The operation may be repeated, making consecutive exposures on different portions of the plate, by changing the location of the aperture in the frame. It will be seen that by placing the larger opening of the aperture toward the outside, the same will correspond to some extent with the conical shape of the focused beam and reduce the width of the division lines between exposures of the plate.

Although I have shown and described the device as being slidable in a groove in the back of the camera it will be understood that the same may be permanently or detachably secured in any manner desired and it will further be seen that the shutters or the apertures may be varied in number and shape, all without altering the character of the invention.

What I claim is:

1. In a device of the class described, a frame positioned within the body of a camera and between the sensitized surface and the lens, and a plurality of shutters detachably secured in apertures formed in said frame.

2. In a device of the class described, a screen seated within the body of a camera and between the sensitizing surface and the lens, said screen comprising an outside frame, and intersecting transverse members secured thereto, the members of said frame being rabbeted to provide seats, and a plurality of shutters adapted to be detachably secured in said apertures.

3. In a device of the class described, a screen adapted to be seated within the body of the camera and between the sensitized surface and the lens, said screen comprising a rectangular frame, intersecting transverse members secured thereto, the members of said frame being rabbeted to provide seats, a plurality of shutters adapted to fit said seats and means for detachably securing said shutters in place, substantially as and for the purpose specified.

In testimony whereof, I affix my signature, in presence of two witnesses.

WILLIAM N. SMITH.

Witnesses:
T. A. WOODS,
T. E. STEWART.